(12) United States Patent
Li et al.

(10) Patent No.: US 9,751,960 B2
(45) Date of Patent: Sep. 5, 2017

(54) CATALYST COMPONENT FOR OLEFIN POLYMERIZATION, CATALYST, AND USE THEREOF

(71) Applicants: China Petroleum & Chemical Corporation, Beijing (CN); Beijing Research Institute of Chemical Industry, China Petroleum & Chemical Corporation, Beijing (CN)

(72) Inventors: Changxiu Li, Beijing (CN); Mingzhi Gao, Beijing (CN); Haitao Liu, Beijing (CN); Jianhua Chen, Beijing (CN); Jing Ma, Beijing (CN); Jixing Ma, Beijing (CN); Xiaoxia Cai, Beijing (CN); Jun Wang, Beijing (CN); Xiaofan Zhang, Beijing (CN); Jianjun Hu, Beijing (CN)

(73) Assignees: China Petroleum & Chemical Corporation, Beijing (CN); Beijing Research Institute of Chemical Industry, China Petroleum & Chemical Corporation, Beijing (CN)

(*) Notice: Subject to any disclaimer, the term of this patent is extended or adjusted under 35 U.S.C. 154(b) by 0 days.

(21) Appl. No.: 14/892,533

(22) PCT Filed: May 21, 2014

(86) PCT No.: PCT/CN2014/078050
§ 371 (c)(1),
(2) Date: Nov. 19, 2015

(87) PCT Pub. No.: WO2014/187323
PCT Pub. Date: Nov. 27, 2014

(65) Prior Publication Data
US 2016/0115257 A1 Apr. 28, 2016

(30) Foreign Application Priority Data

May 21, 2013 (CN) .......................... 2013 1 0190424
May 21, 2013 (CN) .......................... 2013 1 0190990

(51) Int. Cl.
C08F 10/06 (2006.01)
(52) U.S. Cl.
CPC .................... C08F 10/06 (2013.01)
(58) Field of Classification Search
None
See application file for complete search history.

(56) References Cited

FOREIGN PATENT DOCUMENTS

| CN | 1453298 A | 11/2003 |
|---|---|---|
| CN | 1552742 A | 12/2004 |
| CN | 101724101 A | 6/2010 |
| CN | 101864009 A | 10/2010 |
| CN | 101885789 A | 11/2010 |
| CN | 102040683 A | 5/2011 |
| CN | 102234337 A | 11/2011 |
| CN | 102234338 A | 11/2011 |
| CN | 102276765 A | 12/2011 |
| CN | 102453185 A | 5/2012 |
| CN | 103012625 A | 4/2013 |
| CN | 103012632 A | 4/2013 |
| EP | 1970388 A1 | 9/2008 |
| EP | 2562189 A1 | 2/2013 |

OTHER PUBLICATIONS

International Search Report for International Application No. PCT/CN2014/078050, mailed Sep. 1, 2014.
Written Opinion for International Application No. PCT/CN2014/078050, mailed Sep. 1, 2014.
International Preliminary Report of Patentability for International Application No. PCT/CN2014/078050, mailed Nov. 24, 2015.

Primary Examiner — Catherine S Branch
(74) Attorney, Agent, or Firm — Duane Morris LLP

(57) ABSTRACT

The present disclosure provides a solid catalyst component for olefin polymerization, comprising magnesium, titanium, a halogen, and an electron donor, wherein the electron donor is at least one selected from the group consisting of diol diester compounds as shown in Formula (I). The catalyst according to the present disclosure has significantly improved polymerization activity, hydrogen response, and stereoselectivity. According to the present disclosure, when the catalyst system containing a diol diester compound as shown in Formula (I) of the present disclosure is used in olefin polymerization, the catalyst shows good comprehensive performance, including high catalytic activity. In particular, in the presence of highly concentrated hydrogen, the catalyst has an improved hydrogen response and/or isotacticity of the polymers obtained can be significantly improved. The catalyst of the present disclosure is beneficial for obtaining polymers with a high melt index and high isotacticity, and for development of polymers of different grades.

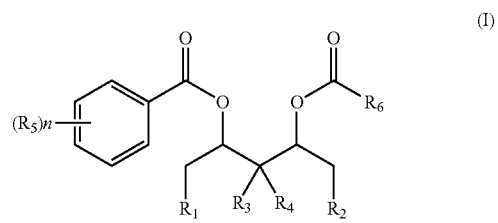

20 Claims, No Drawings

CATALYST COMPONENT FOR OLEFIN POLYMERIZATION, CATALYST, AND USE THEREOF

FIELD OF THE INVENTION

The present disclosure relates to a catalyst component, in particular to a catalyst component for preparing olefin polymers of a high melt index and high isotacticity. The present disclosure further relates to a catalyst comprising the catalyst component, and use of the catalyst in olefin polymerization.

BACKGROUND OF THE INVENTION

As is well-known, a solid titanium based catalyst component with magnesium, titanium, halogens, and electron donors as basic ingredients can be used in olefin polymerization, in particular in polymerization of α-olefins having three or more carbon atoms, to produce polymers with a high yield and of high stereoregularity. Electron donor compounds are a necessary ingredient of the catalyst component. With development of internal electron donor compounds, catalysts for olefin polymerization are continuously upgraded. Currently, a plurality of electron donor compounds have been disclosed, such as polycarboxylic acids, monocarboxylic esters or polycarboxylic esters, anhydrides, ketones, monoethers or polyethers, alcohols, amines, and derivatives thereof.

In the prior art, there is citation of a diol diester compound, which, when serving as an electron donor, enables a catalyst with excellent comprehensive performance in olefin polymerization. When the catalyst is used in propylene polymerization, it presents high polymerization activity and stereoselectivity, producing polymers with wide molecular weight distribution. However, the activity, hydrogen response, or stereoselectivity of the catalyst are not really satisfactory, especially in producing polymers of high melt indexes in the presence of highly concentrated hydrogen, wherein isotactic indexes of the polymers obtained are still to be improved.

The present disclosure provides a catalyst component and a catalyst, using a diol diester as an internal electron donor compound, wherein said diol diester is obtained by reacting a non-end group diol having more than 6 carbon atoms in the straight chain with benzoic acid having at least one hydrocarbyl, i.e., $C_m$ (m≥2) substituted group. The catalyst of the present disclosure has a high polymerization activity and hydrogen response. When the catalyst of the present disclosure is used in olefin polymerization, especially propylene polymerization, polymers with higher isotacticity or a higher melt index can be obtained.

SUMMARY OF THE INVENTION

To eliminate the defects in the prior art, the inventor of the present disclosure has researched into the art and unexpectedly discovered that a catalyst component containing a 1,3-diol benzoate compound with a certain structure (a diol diester obtained by reacting a non-end group diol having more than 6 carbon atoms in the straight chain with benzoic acid having at least one hydrocarbyl, i.e., $C_m$ (m≥2) substituted group) as an internal electron donor compound shows excellent comprehensive performance such as high polymerization activity and hydrogen response in olefin, especially propylene polymerization, or can produce polymers with a high melt index and satisfactory, high isotacticity.

According to one aspect of the present disclosure, it provides a solid catalyst component for olefin polymerization, comprising magnesium, titanium, a halogen, and an electron donor, wherein the electron donor is at least one selected from the group consisting of diol diester compounds as shown in Formula (I):

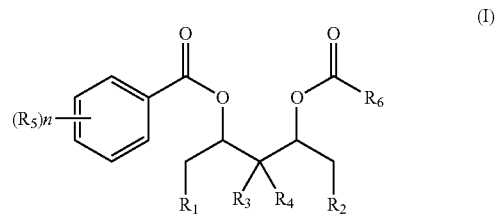

wherein, $R_1$ to $R_4$, identical with or different from each other, can be independently selected from hydrogen, halogens, and substituted or non-substituted $C_1$ to $C_{10}$ hydrocarbyl groups, with at least one of $R_1$ and $R_2$ being a substituted or non-substituted $C_1$ to $C_{10}$ hydrocarbyl group, and $R_3$ and $R_4$ optionally being bonded to form a ring;

wherein $R_5$ is selected from substituted or non-substituted $C_2$ to $C_{10}$ hydrocarbyl groups, with n being an integer in the range from 1 to 5; and wherein $R_6$ is selected from substituted or non-substituted $C_1$ to $C_{15}$ hydrocarbyl groups.

Regarding the catalyst component (also referred to as solid catalyst component or catalyst solid component) of the present disclosure, the term "substituted" means that the hydrogen in corresponding groups can be optionally substituted by alkyl groups or halogen atoms. For example, said substituted $C_1$ to $C_{10}$ straight alkyl groups, $C_3$ to $C_{15}$ branched alkyl groups. $C_3$ to $C_{15}$ cycloalkyl groups, $C_6$ to $C_{20}$ aryl groups, or $C_7$ to $C_{20}$ alkaryl or aralkyl groups mean that the hydrogen in said alkyl, aryl, alkaryl, or aralkyl groups can be optionally substituted by alkyl groups or halogen atoms. In the present disclosure, aryl hydrocarbyl groups comprise aralkyl, aryl alkenyl groups, etc., and hydrocarbyl aryl groups comprise alkaryl groups, alkenyl aryl groups, etc.

In one specific embodiment of the above catalyst component, in the diol diester compounds as shown in Formula (I), $R_1$ to $R_4$, identical with or different from each other, can be independently selected from hydrogen, halogens, substituted or non-substituted $C_1$ to $C_{10}$ straight alkyl groups, $C_3$ to $C_{10}$ branched alkyl groups, $C_3$ to $C_{10}$ cycloalkyl groups, $C_6$ to $C_{10}$ aryl groups, $C_7$ to $C_{10}$ alkaryl groups, and $C_7$ to $C_{10}$ aralkyl groups:

wherein $R_5$ is selected from substituted or non-substituted $C_2$ to $C_{10}$ straight alkyl groups, $C_3$ to $C_{10}$ branched alkyl groups, $C_3$ to $C_{10}$ cycloalkyl groups, $C_6$ to $C_{10}$ aryl groups, $C_7$ to $C_{10}$ alkaryl groups, and $C_7$ to $C_{10}$ aralkyl groups; and wherein $R_6$ is selected from substituted or non-substituted $C_1$ to $C_{10}$ straight alkyl groups, $C_3$ to $C_{10}$ branched alkyl groups. $C_3$ to $C_{10}$ cycloalkyl groups. $C_6$ to $C_{10}$ aryl groups. $C_7$ to $C_{15}$ hydrocarbyl aryl groups, and $C_7$ to $C_{15}$ aryl hydrocarbyl groups.

In another specific embodiment of the above catalyst component, in the diol diester compounds as shown in Formula (I), $R_1$ and $R_2$ are selected from hydrogen, halogenated or non-halogenated $C_1$ to $C_6$ straight alkyl groups (for example $C_1$ to $C_3$ straight alkyl groups), and $C_3$ to $C_6$ branched alkyl groups;

wherein $R_3$ and $R_4$ are selected from hydrogen, halogens, and halogenated or non-halogenated $C_1$ to $C_6$ straight alkyl groups and $C_3$ to $C_6$ branched alkyl groups;

wherein $R_5$ is selected from halogenated or non-halogenated $C_2$ to $C_6$ straight alkyl groups and $C_3$ to $C_6$ branched alkyl groups, with n equaling 1 or 2, preferably, n being 1, and $R_5$ being a para- or ortho-substituted group; and wherein $R_6$ is selected from halogenated or non-halogenated $C_4$ to $C_{10}$ straight or branched alkyl groups, $C_5$ to $C_{10}$ cycloalkyl groups, $C_6$ to $C_{10}$ aryl groups, $C_8$ to $C_{15}$ aryl alkenyl groups, $C_7$ to $C_{15}$ alkaryl groups, and $C_7$ to $C_{15}$ aralkyl groups, preferably halogenated or non-halogenated $C_8$ to $C_{12}$ aryl alkenyl groups, $C_7$ to $C_{15}$ alkaryl groups, and $C_7$ to $C_{15}$ aralkyl groups.

According to the present disclosure, at least one of $R_1$ and $R_2$ is a substituted or non-substituted $C_1$ to $C_{10}$ hydrocarbyl group. That is, $R_1$ and $R_2$ are not simultaneously selected from hydrogen and halogens. In other words, at most one of $R_1$ and $R_2$ (i.e., $R_1$, or $R_2$) is selected from hydrogen and halogens. Said halogens can for example comprise chlorine, bromine, and iodine atoms.

In one specific embodiment according to the catalyst component of the present disclosure, the diol diester compounds as shown in Formula (I) are one or more selected from the group consisting of 2,4-hexanediol-bis(4-ethyl benzoate), 2,4-hexanediol-bis(4-n-propyl benzoate), 2,4-hexanediol-bis(4-n-butyl benzoate), 2,4-hexanediol-bis(4-iso-butyl benzoate), 2,4-hexanediol-bis(4-tert-butyl benzoate), 2,4-hexanediol-bis(4-hexyl benzoate), 3-methyl-2,4-hexanediol-bis(4-ethyl benzoate), 3-methyl-2,4-hexanediol-bis(4-n-propyl benzoate), 3-methyl-2,4-hexanediol-bis(4-n-butyl benzoate), 3-methyl-2,4-hexanediol-bis(4-iso-butyl benzoate), 3-methyl-2,4-hexanediol-bis(4-tert-butyl benzoate), 3-methyl-2,4-hexanediol-bis(4-hexyl benzoate), 3-ethyl-2,4-hexanediol-bis(4-ethyl benzoate), 3-ethyl-2,4-hexanediol-bis(4-n-propyl benzoate), 3-ethyl-2,4-hexanediol-bis(4-n-butyl benzoate), 3-ethyl-2,4-hexanediol-bis(4-iso-butyl benzoate), 3-ethyl-2,4-hexanediol-bis(4-tert-butyl benzoate), 3-ethyl-2,4-hexanediol-bis(4-hexyl benzoate), 3,5-heptanediol-bis(4-ethyl benzoate), 3,5-heptanediol-bis(4-n-propyl benzoate), 3,5-heptanediol-bis(4-iso-propyl benzoate), 3,5-heptanediol-bis(4-n-butyl benzoate), 3,5-heptanediol-bis(4-iso-butyl benzoate), 3,5-heptanediol-bis(4-tert-butyl benzoate), 3,5-heptanediol-bis(4-pentyl benzoate), 3,5-heptanediol-bis(4-hexyl benzoate), 3,5-heptanediol-cinnamic acid-4-ethyl benzoate, 4-methyl-3,5-heptanediol-bis(4-ethyl benzoate), 4-methyl-3,5-heptanediol-bis(4-n-propyl benzoate), 4-methyl-3,5-heptanediol-bis(4-iso-propyl benzoate), 4-methyl-3,5-heptanediol-bis(4-n-butyl benzoate), 4-methyl-3,5-heptanediol-bis(4-iso-butyl benzoate), 4-methyl-3,5-heptanediol-bis(4-tert-butyl benzoate), 4-methyl-3,5-heptanediol-bis(4-pentyl benzoate), 4-methyl-3,5-heptanediol-bis(4-hexyl benzoate), 4-methyl-3,5-heptanediol-cinnamic acid-4-ethyl benzoate, 4-ethyl-3,5-heptanediol-bis(4-ethyl benzoate), 4-ethyl-3,5-heptanediol-bis(4-n-propyl benzoate), 4-ethyl-3,5-heptanediol-bis(4-iso-propyl benzoate), 4-ethyl-3,5-heptanediol-bis(4-n-butyl benzoate), 4-ethyl-3,5-heptanediol-bis(4-iso-butyl benzoate), 4-ethyl-3,5-heptanediol-bis(4-tert-butyl benzoate), 4-ethyl-3,5-heptanediol-bis(4-pentyl benzoate), 4-ethyl-3,5-heptanediol-bis(4-hexyl benzoate), 4-ethyl-3,5-heptanediol-cinnamic acid-4-ethyl benzoate, 4-n-propyl-3,5-heptanediol-bis(4-tert-butyl benzoate), 4-n-butyl-3,5-heptanediol-bis(4-tert-butyl benzoate), 4,4-dimethyl-3,5-heptanediol-bis(4-tert-butyl benzoate), 4-methyl-4-ethyl-3,5-heptanediol-bis(4-tert-butyl benzoate), 4-methyl-4-n-propyl-3,5-heptanediol-bis(4-tert-butyl benzoate), 3-methyl-2,4-heptanediol-bis(4-n-propyl benzoate), 3-methyl-2,4-heptanediol-bis(4-iso-propyl benzoate), 4-methyl-3,5-octanediol-bis(4-tert-butyl benzoate), 4-ethyl-3,5-octanediol-bis(4-tert-butyl benzoate), 4-n-propyl-3,5-octanediol-bis(4-tert-butyl benzoate), 4-n-butyl-3,5-octanediol-bis(4-tert-butyl benzoate), 4,4-dimethyl-3,5-octanediol-bis(4-tert-butyl benzoate), 4,4-diethyl-3,5-octanediol-bis(4-n-propyl benzoate), 4,4-di-n-propyl-3,5-octanediol-bis(4-tert-butyl benzoate), 4-methyl-4-ethyl-3,5-octanediol-bis(4-tert-butyl benzoate), 4,6-nonanediol-bis(4-ethyl benzoate), 4,6-nonanediol-bis(4-n-propyl benzoate), 4,6-nonanediol-bis(4-n-butyl benzoate), 4,6-nonanediol-bis(4-iso-butyl benzoate), 4,6-nonanediol-bis(4-tert-butyl benzoate), 4,6-nonanediol-bis(4-hexyl benzoate), 4,6-nonanediol-cinnamic acid-4-ethyl benzoate, 5-methyl-4,6-nonanediol-bis(4-ethyl benzoate), 5-methyl-4,6-nonanediol-bis(4-n-propyl benzoate), 5-methyl-4,6-nonanediol-bis(4-n-butyl benzoate), 5-methyl-4,6-nonanediol-bis(4-iso-butyl benzoate), 5-methyl-4,6-nonanediol-bis(4-tert-butyl benzoate), 5-methyl-4,6-nonanediol-bis(4-hexyl benzoate), 5-ethyl-4,6-nonanediol-bis(4-ethyl benzoate), 5-ethyl-4,6-nonanediol-bis(4-n-propyl benzoate), 5-ethyl-4,6-nonanediol-bis(4-n-butyl benzoate), 5-ethyl-4,6-nonanediol-bis(4-iso-butyl benzoate), 5-ethyl-4,6-nonanediol-bis(4-tert-butyl benzoate), 5-ethyl-4,6-nonanediol-bis(4-hexyl benzoate), 5-n-propyl-4,6-nonanediol-bis(4-tert-butyl benzoate), 5-n-butyl-4,6-nonanediol-bis(4-n-butyl benzoate), 5,5-dimethyl-4,6-nonanediol-bis(4-tert-butyl benzoate). 5,5-diethyl-4,6-nonanediol-bis(4-hexyl benzoate), 5,5-di-n-propyl-4,6-nonanediol-bis(4-pentyl benzoate), and 5,5-dibutyl-4,6-nonanediol-bis(4-tert-butyl benzoate).

In the present disclosure, the method for preparing the electron donor compounds as shown in Formula (I) is known. For example, the electron donor compounds can be prepared by reacting corresponding diols with acyl chlorides or anhydrides. Reference can be made to the synthesis method as disclosed in US20050096389.

In the above catalyst component, based on total weight of the catalyst component, the content of the diol diester compounds as shown in Formula (I) accounts for 1% to 25% by weight, the content of titanium 0.5% to 8% by weight, and the content of magnesium 3% to 25% by weight. Preferably, the content of the diol diester compounds as shown in Formula (I) accounts for 5% to 20% by weight, the content of titanium 1% to 6% by weight, and the content of magnesium 10% to 20% by weight. More preferably, the content of the diol diester compounds as shown in Formula (I) accounts for 8% to 12% by weight, the content of titanium 2% to 4% by weight, and the content of magnesium 15% to 19% by weight. The content of the diol diesters as shown in Formula (I) can be measured by liquid chromatography, wherein high performance liquid chromatography Waters-600E, with a column of C-18, a column temperature of 30° C., a mobile phase of methanol-water at a flow rate of 1.0 mL/min, and an ultraviolet detector is adopted. The content of titanium can be measured by ultraviolet-visible spectrophotometer 752S, with a sulfuric acid of 1 mol/L as the blank solution. And the content of magnesium can be measured by titrimetry with an EDTA solution of 0.02 mol/L.

According to another specific embodiment of the present disclosure, the catalyst component is prepared by reacting magnesium compounds, titanium compounds, and the diol diester compounds as shown in Formula (I).

In the catalyst component of the present disclosure, based on per mol of the magnesium compounds, the dosage of the titanium compounds is in the range from 0.5 mol to 150 mol, and the dosage of the diol diester compounds is in the range from 0.01 mol to 5 mol, preferably from 0.02 mol to 2 mol, and more preferably from 0.02 mol to 0.4 mol.

According to the present disclosure, the magnesium compounds are selected from the group consisting of magnesium dihalides, alkoxy magnesium compounds, alkyl magnesium compounds, hydrates or alcoholates of magnesium dihalides, and derivatives of magnesium dihalides with halogen atoms thereof being substituted by alkoxy groups or halogenated alkoxy groups, preferably magnesium dihalides and alcoholates thereof, such as magnesium dichloride, magnesium dibromide, magnesium diiodide, and alcoholates thereof.

According to the present disclosure, the titanium compounds preferably have a general formula of $TiX_m(OR^1)_{4-m}$, wherein $R^1$ is a $C_1$ to $C_{20}$ hydrocarbyl group, X a halogen, and $1 \leq m \leq 4$. The titanium compounds can, for example, be selected from the group consisting of titanium tetrachloride, titanium tetrabromide, titanium tetraiodide, tetrabutoxy titanium, tetraethoxy titanium, triethoxy titanium chloride, diethoxy titanium dichloride, and ethoxy titanium trichloride, preferably titanium tetrachloride.

It should be particularly pointed out that in one specific embodiment, the reaction comprises dissolving magnesium compounds into a solvent system composed of organic epoxides, organic phosphorus compounds, and an inert diluent to form a homogeneous solution, which is to be mixed with titanium compounds. After that, a solid is precipitated in the presence of a co-precipitating agent. Eventually, the solid is treated with compounds as shown in Formula (I), so that the compounds as shown in Formula (I) will be loaded on the solid. The solid can be further treated with a titanium tetrahalide and an inert diluent where necessary, about which reference can be made to CN 85100997. In the catalyst component as prepared above, the content of the diol diester compounds as shown in Formula (I) is in the range from 1% to 25% by weight, the content of titanium in the range from 0.5% to 8% by weight, and the content of magnesium in the range from 3% to 25% by weight. Preferably, the content of the diol diester compounds as shown in Formula (I) is in the range from 5% to 20% by weight, the content of titanium in the range from 1% to 6% by weight, and the content of magnesium in the range from 10% to 20% by weight. More preferably, the content of the diol diester compounds as shown in Formula (I) is in the range from 8% to 12% by weight, the content of titanium in the range from 2% to 4% by weight, and the content of magnesium in the range from 15% to 19% by weight.

According to the present disclosure, based on per mol of the magnesium compounds, the dosage of the organic epoxides is in the range from 0.2 mol to 10 mol, the dosage of the organic phosphorus compounds in the range from 0.1 mol to 3 mol, and the dosage of the co-precipitating agent in the range from 0 mol to 1.0 mol.

According to the present disclosure, the organic epoxides can comprise the compounds that are selected from the group consisting of aliphatic olefins, dienes, halogenated aliphatic olefins, diene oxides, glycidyl ethers, and inner ethers having 2 to 8 carbon atoms. Specific compounds thereof comprise ethylene oxide, propylene oxide, butylene oxide, butadiene oxide, butadiene dioxide, epichlorohydrin, glycidyl methyl ether, diglycidyl ether, and tetrahydrofuran.

According to the present disclosure, the organic phosphorus compounds can be hydrocarbyl esters or halogenated hydrocarbyl esters of orthophosphoric acid or phosphorous acid. Specific compounds thereof comprise trimethyl orthophosphate, triethyl orthophosphate, tributyl orthophosphate, triphenyl orthophosphate, trimethyl phosphite, triethyl phosphite, tributyl phosphite, and triphenyl phosphite.

According to the present disclosure, the co-precipitating agent can be selected from the group consisting of organic anhydrides, organic acids, ethers, and ketones. Specific compounds thereof comprise acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether, diamyl ether, etc.

According to the present disclosure, magnesium compounds can also be dissolved into a solvent system containing organic alcohol compounds, which can be monohydric alcohols having 2 to 8 carbon atoms. For example, the reaction can comprise dissolving the magnesium compounds into a solvent system containing hydrocarbon compounds and alcohol compounds to form a solution, which is to be mixed with titanium compounds at, for example, from −40° C. to 40° C. followed by addition of electron donor compounds at, for example, from −40° C. to 150° C. A solid catalyst component is obtained after performance of washing by an inert diluent. The electron donor compounds can be at least one selected from the group consisting of the diol ester compounds as shown in Formula (I). In the catalyst component as prepared above, based on total weight of the catalyst component, the content of the diol diester compounds as shown in Formula (I) is in the range from 3% to 25% by weight, the content of titanium in the range from 0.5% to 8% by weight, and the content of magnesium in the range from 8% to 25% by weight. Preferably, the content of the diol diester compounds as shown in Formula (I) is in the range from 5% to 20% by weight, the content of titanium in the range from 1% to 6% by weight, and the content of magnesium in the range from 10% to 20% by weight.

The hydrocarbon compounds can comprise the compounds that are selected from the group consisting of straight or branched $C_6$ to $C_{12}$ alkanes and $C_6$ to $C_{15}$ aromatic hydrocarbons, specifically including hexane, heptane, octane, nonane, decane, benzene, toluene, xylene, etc. The alcohol compounds can comprise those selected from the group consisting of aliphatic alcohols, cycloaliphatic alcohols, and aromatic alcohols, wherein the aliphatic alcohols can be straight or branched $C_1$ to $C_{10}$ aliphatic alcohols; the cycloaliphatic alcohols can be $C_3$ to $C_{10}$ cycloaliphatic alcohols; and the aromatic alcohols can be $C_6$ to $C_{20}$ aryl alcohols or alkylaryl alcohols, specifically including ethanol, propanol, butanol, pentanol, hexanol, octanol, iso-octanol, etc, or mixtures thereof. The inert diluent can be selected from the group consisting of hexane, heptane, octane, decane, benzene, toluene, and xylene.

The catalyst component of the present disclosure can also be prepared by the following methods.

Method 1: The catalyst component can be prepared by the method as disclosed in CN 1040379. First, a magnesium compound and an organic alcohol compound with a molar ratio in the range from 2:1 to 5:1 therebetween are mixed with an inert diluent. The temperature of the resulting mixture is raised to range from 120° C. to 150° C., which precedes addition of an anhydride at such an amount that enables the molar ratio of the magnesium to the anhydride in the range from 5:1 to 10:1, followed by reaction from 1 to 5 hours. Next, an alcoholate cooled to room temperature is added into a titanium compound solution which is pre-cooled to a temperature in the range from −15° C. to −40° C., at such an amount ratio therebetween that enables the molar ratio of titanium to magnesium in the range from 20:1 to 50:1. The temperature is raised to 90° C. to 110° C., after which a compound as shown in Formula (I) is added at such an amount that enables the molar ratio of magnesium to the internal electron donor in the range from 2:1 to 10:1, followed by reaction at a temperature in the range from 100° C. to 130° C. for 1 to 3 hours. Subsequently, solid particles are separated by filtration. The solid particles are added into a titanium compound solution at such an amount that enables the molar ratio of titanium to magnesium in the range from 20:1 to 50:1, which precedes reaction at a temperature in the range from 100° C. to 130° C. under stirring for 1.5 to 3 hours. Solid particles are obtained through filtration, washed with an inert diluent at a temperature in the range from 50° C. to 80° C., and are dried to obtain the catalyst component.

Method 2: The solid catalyst component can be prepared by reacting the titanium compound of the present disclosure, specifically $TiCl_4$, for example, with an adduct having a general formula of $MgCl_2 \cdot pROH$. In the formula $MgCl_2 \cdot pROH$, "p" is a number in the range from 0.1 to 6, preferably from 2 to 3.5, and "R" is a hydrocarbyl group having 1 to 18 carbon atoms. The adduct can be suitably made into a sphere through the following way. In the presence of an inert hydrocarbon that is immiscible with the adduct, an alcohol (ROH) is mixed with $MgCl_2$ to form an emulsion, which is quenched, so that the adduct can be solidified in the form of spherical particles. The adduct thus obtained can be directly reacted with a titanium compound. Alternately, before being reacted with the titanium compound, the adduct can first be dealcoholized under thermal control at a temperature in the range from 80° C. to 130° C., after which there will be generally less than 3 mol, preferably 0.1 to 2.7 mol of alcohol in per mol of the adduct. The adduct, either being dealcoholized or not, can be suspended in cold (commonly 0° C.) $TiCl_4$ to form a mixture, which is heated to a temperature in the range from 80° C. to 130° C. through temperature programming and kept constant for 0.1 to 2 hours for reaction between the adduct and the titanium compound. The above treatment with $TiCl_4$ can be performed once or more times, during which a compound as shown in Formula (I) of the present disclosure can be added for treatment, which can also be performed for once or more times.

The catalyst component can be specifically prepared by the method as disclosed in CN 1091748. A magnesium chloride alcoholate melt is dispersed in a dispersant system of while oil and silicone oil through velocity mixing to form an emulsion, which is released into a liquid coolant to be cooled and set into microspheres of the magnesium chloride alcoholate. The liquid coolant can be an inert hydrocarbon solvent having a low boiling point, such as petroleum ether, pentane, hexane, heptane, etc. The microspheres of magnesium chloride alcoholate obtained are washed and dried to form a spherical carrier, wherein the molar ratio of the alcohol to magnesium chloride is in the range from 2:1 to 3:1, preferably from 2:1 to 2.5:1, and the carrier has a grain size in the range from 10 μm to 300 μm, preferably from 30 μm to 150 μm.

The above spherical carrier is treated with an excessive amount of titanium tetrachloride at a low temperature. While the temperature is gradually raised, an electron donor as shown in Formula (I) of the present disclosure is added. After the above treatment, the spherical carrier is washed for a plurality of times with an inert solvent, and then dried to obtain the catalyst component in the form of a spherical solid powder. The molar ratio of the titanium tetrachloride to the magnesium chloride is in the range from 20:1 to 200:1, preferably from 30:1 to 60:1. The initial temperature of treatment is in the range from −30° C. to 0° C., preferably from −25° C. to −20° C., and the final temperature of treatment is in the range from 80° C. to 136° C., preferably from 100° C. to 130° C.

Method 3: A dialkoxy magnesium compound is added into an aromatic hydrocarbon compound under stirring to form a suspension, which is treated with titanium tetrachloride at a temperature in the range from −20° C. to 100° C. Reaction therebetween is performed at a temperature in the range from 0° C. to 130° C., during which, an electron donor as shown in Formula (I) of the present disclosure is added at a temperature in the range from −20° C. to 130° C., to obtain a solid. The solid is then washed with an aromatic hydrocarbon compound, treated by titanium tetrachloride in an aromatic solvent at a temperature in the range from 0° C. to 130° C. washed with an inert solvent, and pumped dry to obtain the catalyst component. Based on per mol of the dialkoxy magnesium compound, the dosage of titanium tetrachloride is in the range from 0.5 mol to 100 mol, and the dosage of the electron donor is in the range from 0.01 mol to 10 mol.

Method 4: Titanium tetrachloride or an aromatic hydrocarbon solution thereof can be used to halogenate a dihydrocarbyloxy magnesium compound such as a dialkoxy magnesium compound or a diaryloxy magnesium compound at a temperature in the range from 80° C. to 130° C. The above halogenation can be repeated once or a plurality of times, during which a compound as shown in Formula (I) of the present disclosure can be added.

Method 5: The method as disclosed in U.S. Pat. No. 4,540,679 is used to prepare the catalyst component of the present disclosure. To start with, a magnesium alcoholate is reacted with carbon dioxide to prepare a magnesium hydrocarbyl carbonate carrier. A transition metal compound (preferably a tetravalent titanium compound) is reacted with the magnesium hydrocarbyl carbonate carrier, and an electron donor as shown in Formula (I) of the present disclosure in an inert solvent at a certain ratio, wherein the molar ratio of the transition metal to the magnesium is at least 0.5:1, and the dosage of the electron donor as shown in Formula (I) of the present disclosure is at most 1.0 mol per gram of titanium atoms. The inert solvent should be purified to remove substances such as water, oxygen, and carbon dioxide that easily cause poisoning of the catalyst. The reaction is carried out at a temperature in the range from −10° C. to 170° C. for a period from several minutes to several hours.

The catalyst component of the present disclosure can also be prepared by forming an emulsion with a magnesium compound, an electron donor, etc. in a diluent, followed by addition of a titanium compound for fixation to form a spherical solid, which is then treated to obtain the catalyst component.

In any one of the above mentioned methods, the electron donors as shown in Formula (I) can be added either in the form of compounds or in other forms. For example, a suitable precursor of an electron donor as shown in Formula (I) can be used to in-situ obtain the electron donor through, for example, known chemical reactions such as esterification reactions, etc.

According to another aspect of the present disclosure, it provides a catalyst for olefin polymerization, comprising the following components:

component a): the catalyst component according to the first aspect of the present disclosure; and component b): alkylaluminum compounds.

In the above catalyst, the alkylaluminum compounds have a general formula of $AlR_nX_{3-n}$, wherein R can be selected from the group consisting of hydrogen, and $C_1$ to $C_{20}$ hydrocarbyl groups, and $1 \leq n \leq 3$. More specifically, the alkylaluminum compounds can be selected from the group consisting of triethyl aluminum, tripropyl aluminum, tri-n-butyl aluminum, tri-iso-butyl aluminum, tri-n-octyl aluminum, tri-iso-octyl aluminum, diethyl aluminum hydride, di-iso-butylaluminum hydride, diethyl aluminum chloride, di-iso-butylaluminum chloride, ethylaluminum sesquichloride, and ethyl aluminum dichloride, preferably triethyl aluminum and tri-iso-butyl aluminum.

The dosage of the alkylaluminum compounds can be a conventional dosage in the art. According to one preferred embodiment of the present disclosure, the molar ratio of component a) to component b) based on the molar ratio of titanium to aluminum is in the range from 1:5 to 1:1,000, for example from 1:20 to 1:250.

In the above catalyst, the catalyst further comprises component c): an external electron donor, which is selected from the group consisting of organosilicon compounds, ethers, esters, and mixtures thereof. When the external electron donor is added, olefin polymers with high stereoregularity, for example, organosilicon compounds having a general formula of $R_nSi(OR')_{4-n}$ can be obtained, wherein $0 \leq n \leq 3$; R and R', identical with or different from each other, can be alkyl, cycloalkyl, aryl, halogenated alkyl, and amino groups; and R can also be a halogen or hydrogen atom. Specific compounds thereof can be selected from the group consisting of trimethyl methoxy silane, trimethyl ethoxy silane, dimethyl dimethoxy silane, dimethyl diethoxy silane, diphenyl dimethoxy silane, diphenyl diethoxy silane, phenyl triethoxy silane, phenyl trimethoxy silane, vinyl trimethoxy silane, cyclohexyl methyl dimethoxy silane, and methyl-tert-butyl dimethoxy silane, preferably cyclohexyl methyl dimethoxy silane, and diphenyl dimethoxy silane. The external electron donor compounds can also be ether compounds such as 1,3-diether, ester compounds such as monobenzoate, dibenzoate, and diol diester compounds, and mixtures of organosilicon compounds, ethers, and esters.

In the above catalyst, the dosage of the external electron donor compound can be a conventional dosage in the art. According to one preferred embodiment of the present disclosure, the molar ratio of component c) to component a) based on silicon (or ethers, or esters) to titanium is in the range from 0:1 to 500:1, for example, 0.1:1 to 500:1, 0.1:1 to 100:1, or 1:1 to 50:1.

The catalyst of the present disclosure can be directly added into a reactor for polymerization. Alternately, the catalyst can first participate in a pre-polymerization reaction before the polymerization. In the present disclosure, the term "pre-polymerization" refers to polymerization at a lower conversion. According to the present disclosure, the pre-polymerization catalyst comprises the above solid catalyst component and pre-polymers obtained in the pre-polymerization between the solid catalyst component and olefins, with the pre-polymerization multiples thereof being in the range from 0.1 g to 1,000 g of olefin polymers per g of the catalyst component.

The same α-olefins as mentioned above, preferably ethylene or propylene, can be used for the pre-polymerization. Specifically, a mixture of ethylene or propylene with one or a plurality of α-olefins accounting for at most 20% by mol is particularly preferred for the polymerization. Preferably, the conversion of the catalyst component in the pre-polymerization is about 0.2 g to 800 g of polymers per g of the solid catalyst component.

The pre-polymerization procedure can be performed in the liquid or gaseous phase at a temperature in the range from −40° C. to 80° C., preferably from −20° C. to 50° C. Pre-polymerization steps can be performed in line as one portion of continuous polymerization, or can be independently performed in batch operation. In order to prepare 0.5 g to 20 g of polymers using per g of the solid catalyst component, pre-polymerization of propylene and the catalyst of the present disclosure is particularly preferred. The pressure of the polymerization is in the range from 0.01 MPa to 10 MPa.

According to still another aspect of the present disclosure, it provides a method for polymerization, wherein the olefins are polymerized in the presence of the above solid catalyst component, the catalyst, or pre-polymerization catalyst.

The catalyst of the present disclosure can be directly added into the reactor for polymerization. Alternately, pre-polymerization of olefins in the presence of the catalyst can be first performed to obtain a pre-polymerization catalyst, which is to be added into the reactor for polymerization.

Olefin polymerization of the present disclosure can be performed through a known method for polymerization in the liquid or gaseous phase, or in a combination of the liquid phase and gaseous phase stages. A routine technique such as a slurry process, or a gas phase fluidized bed, etc. can be used. Preferably, a polymerization temperature in the range from 0° C. to 150° C., preferably from 60° C. to 90° C. is adopted.

The olefins of the present disclosure have a general formula of $CH_2=CHR$, wherein R is hydrogen or a $C_1$ to $C_{12}$ alkyl or aryl group. For example, the olefins can be selected from the group consisting of ethylene, propylene, 1-butene, 4-methyl-1-pentene, and 1-hexene, preferably selected from ethylene and propylene. For example, homopolymerization of propylene or copolymerization of propylene and other olefins can be performed. The method of the present disclosure can also be applied in, for example, homopolymerization of ethylene, and copolymerization of ethylene and α-olefins such as propylene, butene, pentene, hexene, octene, and 4-methyl-1-pentene.

It should be noted that, the catalyst component of the present disclosure contains a diol diester as shown in Formula (I) which contains a special structure. The diol diester is obtained by reacting a non-end group diol having more than 6 carbon atoms in the straight chain with benzoic acid containing at least one hydrocarbyl, i.e., $C_m$ (m≥2) substituted group. The diol diester which contains a special structure can further improve hydrogen response and polymerization activity of the catalyst, and produce polymers having a high melt index and high isotacticity. That is, when the polymers obtained in the present disclosure have an equal melt index i.e., an equal hydrogen response, with polymers obtained by using diol esters of other structures, the polymers of the present disclosure would certainly have higher isotacticity, while when the polymers obtained in the present disclosure have equal isotacticity with polymers obtained by using diol esters of other structures, the polymers of the present disclosure would certainly have a higher melt index, i.e., a higher hydrogen response.

According to the present disclosure, when the catalyst system containing a diol diester compound as shown in Formula (I) of the present disclosure is used in olefin polymerization, the catalyst shows good comprehensive performance, including high catalytic activity. In particular, in the presence of highly concentrated hydrogen, the catalyst has an improved hydrogen response and/or isotacticity of the polymers obtained can be significantly improved. The catalyst of the present disclosure is beneficial for obtaining polymers with a high melt index and high isotacticity, and for development of polymers of different grades.

DETAILED DESCRIPTION OF THE EMBODIMENTS

The following examples are used to explain and describe the present disclosure, rather than to limit the present disclosure in any manner.

Test Methods:

1. The isotactic index of a polymer is tested by heptane extraction (6 hours of extraction with boiling heptane): 2 g of a dry sample of the polymer is placed in an extractor to be extracted by boiling heptane for 6 hours. Afterwards, the remainder is dried to a constant weight (g), which is divided by 2 to obtain the isotactic index of the polymer.

2. The melt index (MI) of a polymer is tested by the test standard GB/T 3682~2000.

3. Measurement by nuclear magnetic resonance: nuclear magnetic resonance spectrometer Bruke dmx 300 is used for measurement of $^1$H-NMR (300 MHz; the solvent: $CDCl_3$; internal standard: TMS; measured temperature: 300 K)

Synthesis of Electron Donor Compounds

Synthesis of the compound ID3, i.e., 3,5-heptanediol-bis (4-n-propyl benzoate) is taken as an example.

A methanol solution of 3,5-heptadione (14.2 g of 3,5-heptadione/30 mL of methanol) is dropwise added into a mixture of 2.5 g of sodium borohydride, 0.05 g of sodium hydroxide, and 25 mL of water at a temperature in the range from 0° C. to 10° C. Upon completion, solvent removal is performed by reduced pressure distillation, and the residue thereof is extracted with ethyl acetate. Afterwards, solvent removal is performed again, and 3,5-heptanediol is obtained with a yield of 92%. Fourier transform infrared spectrometer Nicolet 6700 is used for infrared characterization. The IR spectra thereof indicate a strong adsorption peak at 3400 $cm^{-1}$, and no adsorption peak at around 1700 $cm^{-1}$, which is evidence of complete reduction reaction.

Into 0.03 mol of 3,5-heptanediol, 30 ml of tetrahydrofuran and 0.09 mol of pyridine are added. Afterwards, 0.075 mol of 4-n-propyl-benzoyl chloride is added under stirring. The reaction is heated refluxing for 4 hours. After cooling, 20 ml of saturated saline is added. The reaction mixture is extracted with ethyl acetate. The extract thereof is then dried with anhydrous sodium sulfate, and then filtered. After solvent removal is performed, a crude product is purified with a chromatographic column to obtain a colorless viscous liquid, i.e., 3,5-heptanediol-bis(4-n-propyl benzoate), of which the characterization data are listed as follows.

$^1$H NMR (TMS, $CDCl_3$, ppm): δ0.92~1.03 (12H, m, —$CH_3$); 1.62~1.71 (4H, m, —$CH_2$); 1.74~1.81 (4H, m, —$CH_2$); 1.94~2.28 (2H, m, —$CH_2$); 2.59~2.70 (4H, m, —$CH_2$); 5.18~5.25 (2H, m, —CH); 7.15~7.30 (4H, m, —$C_6H_4$—); 7.88~8.04 (4H, m, —$C_6H_4$—).

UPLC: high performance liquid chromatography of Waters Acquity, with a column of BEH C-18, a column temperature of 30° C. a mobile phase of acetonitrile-water at a flow rate of 0.5 mL/min, and an ultraviolet detector is used. The observation is performed at a position of 229 nm. Data obtained thereof read as follows: residence time 9.931 min (37.7%), peaks of (3S,5S)-3,5-heptanediol-bis(4-n-propyl benzoate) and (3R,5R)-3,5-heptanediol-bis(4-n-propyl benzoate); residence time 11.160 min, peak of meso-3,5-heptanediol-bis(4-n-propyl benzoate).

Examples 1 to 5

Preparation of a Catalyst Component

In a reactor in which air is adequately replaced with high purity nitrogen, 6.0 g of magnesium chloride, 119 ml of toluene, 5 ml of epoxy chloropropane, and 15.6 ml of tributyl phosphate (TBP) are successively added. The temperature is raised to 50° C. under stirring and kept constant for 2.5 hours until the solid is completely dissolved. Next, 1.7 g of phthalic anhydride is added, and the temperature is kept for 1 hour. The temperature is then lowered to below −25° C. followed by addition of 70 ml of $TiCl_4$ within one hour. After that, the temperature is slowly raised to 80° C., during which a solid is gradually precipitated out. Subsequently, 4.6 mmol of the diol diester compound (I) as shown in Table 1 is added, and the temperature is kept constant for one hour. After filtration, 80 ml of toluene is added into the reactor and washing is performed twice to obtain a solid precipitate.

Afterwards, 60 ml of toluene and 40 ml of $TiCl_4$ are added into the reactor and the temperature is raised to 108° C., followed by 2 hours of treatment. The filtrate is removed, which precedes addition of another 60 ml of toluene, and 40 ml of $TiCl_4$. The temperature is then raised to 108° C. again, followed by another 2 hours of treatment, and then removal of the filtrate. After that, still another 60 ml of toluene is added, and washing is performed once at a boiling state. Then 60 ml of hexane is added, followed by performance of washing twice. After addition of another 60 ml of hexane, washing is further performed twice at room temperature to obtain the catalyst component. Specific diol diester compounds are shown in Table 1.

Comparative Examples 1 to 2

The steps are similar with those in Examples 1 to 5, except that different diol diester compounds are added into corresponding reactors. Specific diol diester compounds are shown in Table 1.

Examples 6 to 9

Under protection of nitrogen, 4.8 g of anhydrous magnesium chloride, 19.5 g of isooctanol, and 19.5 g of decane as a solvent are added into a 500 ml reactor arranged with a stirrer. The temperature is raised to 130° C. followed by reaction of 1.5 hours until magnesium chloride is completely dissolved. 1.1 g of phthalic anhydride is added into the reactor and the temperature is kept constant at 130° C., followed by reaction of one hour to obtain an alcoholate, which is then cooled to room temperature.

Under protection of nitrogen, the above alcoholate is dropwise added into 120 ml of a $TiCl_4$ solution pre-cooled to −22° C. The temperature is slowly raised to 100° C., followed by addition of 10 mmol of diol diester compounds as shown in Formula (I) respectively. The temperature is raised to 110° C. and kept constant for 2 hours, which precedes hot filtration. Afterwards, 120 ml of $TiCl_4$ is added and the temperature is raised to 110° C. and kept constant for 1 hour, followed by filtration. The solid particles obtained are washed with anhydrous hexane for four times and then dried to obtain the catalyst component. Specific diol diester compounds are as shown in Table 1.

Comparative Examples 3 to 4

The steps are similar with those in Examples 6 to 9, except that different diol diester compounds are added into corresponding reactors. Specific diol diester compounds are shown in Table 1.

Experiments on Propylene Polymerization

The catalyst components prepared in the above examples and comparative examples are respectively used in propylene polymerization, which is performed in the following steps. In a 5 L stainless steel reactor in which air is adequately replaced by gaseous propylene, 2.5 mmol of AlEt$_3$, 0.1 mmol of cyclohexylmethyldimethoxysilane (CHMMS), 8 mg to 10 mg of the solid catalyst components as prepared above, and a certain amount of hydrogen are added. After 2.3 L of liquid propylene is fed into the reactor, the temperature is raised to 70° C. and kept constant for one hour. Subsequently, cooling and pressure releasing are performed to obtain the PP powders of Examples 1 to 9, and Comparative Examples 1 to 4. The data is as shown in Table 1.

improves hydrogen response of the catalyst (i.e., the polymer obtained has a high melt index) and isotacticity of the polymer, especially in the presence of highly concentrated hydrogen. Compared with the pentyl diol diester as adopted in Comparative Example 2, the diol diester compound of the present disclosure significantly improves the melt index of the polymer, especially the melt index of the polymer in the presence of highly concentrated hydrogen, on condition that a high polymer isotacticity is kept. That is, the diol diester compound of the present disclosure improves hydrogen response of the catalyst. Compared with the diol diester as used in Comparative Example 4, which contains a side chain at the α position of the main chain (i.e., not containing a position between two hydroxyl groups), the diol diester compound of the present disclosure greatly improves isotacticity of the polymer on condition that a high activity of the catalyst is kept.

TABLE 1

Result of propylene polymerization

| Number | Diol diester compound | Polymerization activity (kg of PP/g of catalyst) | | Melt index (g/10 min) | | Isotactic index (%) | |
|---|---|---|---|---|---|---|---|
| | | 1.2 NL Hydrogen | 7.2 NL Hydrogen | 1.2 NL Hydrogen | 7.2 NL Hydrogen | 1.2 NL Hydrogen | 7.2 NL Hydrogen |
| Example 1 | ID1 | 57.5 | 68.5 | 1.7 | 30.1 | 98.9 | 96.6 |
| Example 2 | ID2 | 58.5 | 69.8 | 1.7 | 31.9 | 98.8 | 96.6 |
| Example 3 | ID3 | 60.5 | 71.0 | 1.9 | 36.5 | 98.5 | 96.1 |
| Example 4 | ID4 | 52.9 | 60.4 | 2.4 | 55.8 | 98.3 | 95.5 |
| Comparative Example 1 | ID5 | 50.9 | 58.6 | 1.7 | 28.3 | 98.2 | 95.0 |
| Comparative Example 2 | ID6 | 60.0 | 69.0 | 0.9 | 15.1 | 98.8 | 97.1 |
| Example 5 | ID7 | 52.2 | / | 1.6 | / | 97.2 | / |
| Example 6 | ID8 | 56.1 | / | 2.6 | / | 98.1 | / |
| Example 7 | ID9 | 58.2 | 70.5 | 2.6 | 45.7 | 98.8 | 96.5 |
| Example 8 | ID10 | 57.5 | 68.4 | 2.5 | 49.9 | 98.5 | 96.4 |
| Example 9 | ID11 | 54.8 | 62.0 | 2.7 | 50.9 | 98.2 | 96.0 |
| Comparative Example 3 | ID5 | 50.0 | 58.0 | 2.3 | 30.0 | 98.3 | 95.1 |
| Comparative Example 4 | ID12 | 63.1 | 73.6 | 4.9 | 72.4 | 94.7 | 85.4 |

ID1: 2,4-hexanediol-bis(4-n-propyl benzoate)
ID2: 3,5-heptanediol-bis(4-tert-butyl benzoate)
ID3: 3,5-heptanediol-bis(4-n-propyl benzoate)
ID4: 3,5-heptanediol-bis(4-n-butyl benzoate)
ID5: 3,5-heptanediol-bis-benzoate
ID6: 2,4-pentanediol-bis(4-n-propyl benzoate)
ID7: 3,5-heptanediol cinnamic acid-4-n-propyl benzoate
ID8: 4-ethyl-3,5-heptanediol-bis(4-tert-butyl benzoate)
ID9: 3,5-octanediol-bis(4-n-butyl benzoate)
ID10: 4-methyl-3,5-heptanediol-bis(4-n-butyl benzoate)
ID11: 3,5-heptanediol-bis(4-iso-butyl benzoate)
ID12: 2,6-dimethyl-3,5-heptanediol-bis(4-n-propyl benzoate)

The above data indicate that the catalyst which contains a special structured diol diester (as shown in Formula (I) which is obtained by reacting a non-end group diol having more than 6 carbon atoms in the straight chain with benzoic acid having at least one hydrocarbyl, i.e., $C_m$ (m≥2) substituted group) as provided by the present disclosure presents rather good comprehensive performance. Compared with the diol diesters in the comparative examples which are obtained by reacting a non-end group diol with benzoic acid (as adopted in Comparative Examples 1 and 3), the diol diester compound having a special structure (as shown in Formula (I) which is obtained by reacting a non-end group diol having more than 6 carbon atoms in the straight chain with benzoic acid having at least one hydrocarbyl. i.e., $C_m$ (m≥2) substituted group) of the present disclosure does not only significantly improve activity of the catalyst, but also It should be noted that the above examples are only used to explain, rather than to limit the present disclosure in any manner. Although the present disclosure has been discussed with reference to preferable examples, it should be understood that the terms and expressions adopted are for describing and explaining instead of limiting the present disclosure. The present disclosure can be modified within the scope of the claims, or can be amended without departing from the scope or spirits of the present disclosure. Although the present disclosure is described with specific methods, materials, and examples, the scope of the present disclosure herein disclosed should not be limited by the particularly disclosed examples as described above, but can be extended to other methods and uses having the same functions.

The invention claimed is:

1. A catalyst component for olefin polymerization, comprising magnesium, titanium, a halogen, and an electron donor, wherein the electron donor is at least one selected from the group consisting of diol diester compounds, wherein the diol diester compounds are one or more selected from the group consisting of 2,4-hexanediol-bis(4-ethyl benzoate),
2,4-hexanediol-bis(4-n-propyl benzoate),
2,4-hexanediol-bis(4-n-butyl benzoate),
2,4-hexanediol-bis(4-iso-butyl benzoate),
2,4-hexanediol-bis(4-tert-butyl benzoate),
2,4-hexanediol-bis(4-hexyl benzoate),
3-methyl-2,4-hexanediol-bis(4-ethyl benzoate),
3-methyl-2,4-hexanediol-bis(4-n-propyl benzoate),
3-methyl-2,4-hexanediol-bis(4-n-butyl benzoate),
3-methyl-2,4-hexanediol-bis(4-iso-butyl benzoate),
3-methyl-2,4-hexanediol-bis(4-tert-butyl benzoate),
3-methyl-2,4-hexanediol-bis(4-hexyl benzoate),
3-ethyl-2,4-hexanediol-bis(4-ethyl benzoate),
3-ethyl-2,4-hexanediol-bis(4-n-propyl benzoate),
3-ethyl-2,4-hexanediol-bis(4-n-butyl benzoate),
3-ethyl-2,4-hexanediol-bis(4-iso-butyl benzoate),
3-ethyl-2,4-hexanediol-bis(4-tert-butyl benzoate),
3-ethyl-2,4-hexanediol-bis(4-hexyl benzoate),
3,5-heptanediol-bis(4-n-propyl benzoate),
3,5-heptanediol-bis(4-iso-propyl benzoate),
3,5-heptanediol-bis(4-iso-butyl benzoate),
3,5-heptanediol-bis(4-tert-butyl benzoate),
3,5-heptanediol-bis(4-pentyl benzoate),
3,5-heptanediol-bis(4-hexyl benzoate),
3,5-heptanediol-cinnamic acid-4-ethyl benzoate,
4-methyl-3,5-heptanediol-bis(4-ethyl benzoate),
4-methyl-3,5-heptanediol-bis(4-n-propyl benzoate),
4-methyl-3,5-heptanediol-bis(4-iso-propyl benzoate),
4-methyl-3,5-heptanediol-bis(4-n-butyl benzoate),
4-methyl-3,5-heptanediol-bis(4-iso-butyl benzoate),
4-methyl-3,5-heptanediol-bis(4-tert-butyl benzoate),
4-methyl-3,5-heptanediol-bis(4-pentyl benzoate),
4-methyl-3,5-heptanediol-bis(4-hexyl benzoate),
4-methyl-3,5-heptanediol-cinnamic acid-4-ethyl benzoate,
4-ethyl-3,5-heptanediol-bis(4-ethyl benzoate),
4-ethyl-3,5-heptanediol-bis(4-n-propyl benzoate),
4-ethyl-3,5-heptanediol-bis(4-iso-propyl benzoate),
4-ethyl-3,5-heptanediol-bis(4-n-butyl benzoate),
4-ethyl-3,5-heptanediol-bis(4-iso-butyl benzoate),
4-ethyl-3,5-heptanediol-bis(4-tert-butyl benzoate),
4-ethyl-3,5-heptanediol-bis(4-pentyl benzoate),
4-ethyl-3,5-heptanediol-bis(4-hexyl benzoate),
4-ethyl-3,5-heptanediol-cinnamic acid-4-ethyl benzoate,
4-n-propyl-3,5-heptanediol-bis(4-tert-butyl benzoate),
4-n-butyl-3,5-heptanediol-bis(4-tert-butyl benzoate),
4,4-dimethyl-3,5-heptanediol-bis(4-tert-butyl benzoate),
4-methyl-4-ethyl-3,5-heptanediol-bis(4-tert-butyl benzoate),
4-methyl-4-n-propyl-3,5-heptanediol-bis(4-tert-butyl benzoate),
3-methyl-2,4-heptanediol-bis(4-n-propyl benzoate),
3-methyl-2,4-heptanediol-bis(4-iso-propyl benzoate),
4-methyl-3,5-octanediol-bis(4-tert-butyl benzoate),
4-ethyl-3,5-octanediol-bis(4-tert-butyl benzoate),
4-n-propyl-3,5-octanediol-bis(4-tert-butyl benzoate),
4-n-butyl-3,5-octanediol-bis(4-tert-butyl benzoate),
4,4-dimethyl-3,5-octanediol-bis(4-tert-butyl benzoate),
4,4-diethyl-3,5-octanediol-bis(4-n-propyl benzoate),
4,4-di-n-propyl-3,5-octanediol-bis(4-tert-butyl benzoate),
4-methyl-4-ethyl-3,5-octanediol-bis(4-tert-butyl benzoate),
4,6-nonanediol-bis(4-ethyl benzoate),
4,6-nonanediol-bis(4-n-propyl benzoate),
4,6-nonanediol-bis(4-n-butyl benzoate),
4,6-nonanediol-bis(4-iso-butyl benzoate),
4,6-nonanediol-bis(4-tert-butyl benzoate),
4,6-nonanediol-bis(4-hexyl benzoate),
4,6-nonanediol-cinnamic acid-4-ethyl benzoate,
5-methyl-4,6-nonanediol-bis(4-ethyl benzoate),
5-methyl-4,6-nonanediol-bis(4-n-propyl benzoate),
5-methyl-4,6-nonanediol-bis(4-n-butyl benzoate),
5-methyl-4,6-nonanediol-bis(4-iso-butyl benzoate),
5-methyl-4,6-nonanediol-bis(4-tert-butyl benzoate),
5-methyl-4,6-nonanediol-bis(4-hexyl benzoate),
5-ethyl-4,6-nonanediol-bis(4-ethyl benzoate),
5-ethyl-4,6-nonanediol-bis(4-n-propyl benzoate),
5-ethyl-4,6-nonanediol-bis(4-n-butyl benzoate),
5-ethyl-4,6-nonanediol-bis(4-iso-butyl benzoate),
5-ethyl-4,6-nonanediol-bis(4-tert-butyl benzoate),
5-ethyl-4,6-nonanediol-bis(4-hexyl benzoate),
5-n-propyl-4,6-nonanediol-bis(4-tert-butyl benzoate),
5-n-butyl-4,6-nonanediol-bis(4-n-butyl benzoate),
5,5-dimethyl-4,6-nonanediol-bis(4-tert-butyl benzoate),
5,5-diethyl-4,6-nonanediol-bis(4-hexyl benzoate),
5,5-di-n-propyl-4,6-nonanediol-bis(4-pentyl benzoate), and
5,5-dibutyl-4,6-nonanediol-bis(4-tert-butyl benzoate).

2. The catalyst component according to claim 1, wherein the catalyst component is prepared by reacting magnesium compounds, titanium compounds, and the diol diester compounds.

3. The catalyst component according to claim 2, wherein the magnesium compounds are selected from the group consisting of magnesium dihalides, alkoxy magnesium compounds, alkyl magnesium compounds, hydrates or alcoholates of magnesium dihalides, and derivatives of magnesium dihalides with halogen atoms thereof being substituted by alkoxy groups or halogenated alkoxy groups; and
wherein the titanium compounds have a general formula of $TiX_m(OR^1)_{4-m}$, with $R^1$ being a $C_1$ to $C_{20}$ hydrocarbyl group, X a halogen, and $1 \le m \le 4$.

4. The catalyst component according to claim 2, wherein based on one mole of the magnesium compounds, the dosage of the titanium compounds is in the range from 0.5 mole to 150 mole, and that of the diol diester compounds is in the range from 0.01 mole to 5 mole.

5. A catalyst for olefin polymerization, comprising the following components: component a): the catalyst component according to claim 1; and
component b): alkylaluminum compounds.

6. The catalyst according to claim 5, further comprising component c): an external electron donor, which is selected from the group consisting of organosilicon compounds, ethers, and esters.

7. The catalyst according to claim 6, wherein the molar ratio of component a) to component b) based on the molar ratio of titanium to aluminum is in the range from 1:5 to 1:1,000, and/or the molar ratio of component c) to component a) is in the range from 0:1 to 500:1.

8. A prepolymerization catalyst for olefin polymerization, comprising the catalyst according to claim 5, and a prepolymer generated by prepolymerization between said catalyst and olefins, with the prepolymerization multiples thereof being 0.1 g to 1,000 g of olefin polymers per g of the catalyst component.

9. A method for olefin polymerization, wherein an olefin is contacted under polymerization conditions with the catalyst component according to claim 1.

10. The method according to claim 9, wherein the olefins have a general formula of $CH_2$=CHR, with R being hydrogen or a $C_1$ to $C_{12}$ alkyl or aryl group.

11. The catalyst component according to claim 3, wherein based on one mole of the magnesium compounds, the dosage of the titanium compounds is in the range from 0.5 mole to 150 mole, and that of the diol diester compounds is in the range from 0.01 mole to 5 mole.

12. The catalyst according to claim 6, wherein the molar ratio of component a) to component b) based on the molar ratio of titanium to aluminum is in the range from 1:5 to 1:1,000, and/or the molar ratio of component c) to component a) is in the range from 0:1 to 500:1.

13. A method for olefin polymerization, wherein an olefin is contacted under polymerization conditions with the catalyst according to claim 5.

14. The method according to claim 13, wherein the olefins have a general formula of $CH_2$=CHR, with R being hydrogen or a $C_1$ to $C_{12}$ alkyl or aryl group.

15. A method for olefin polymerization, wherein an olefin is contacted under polymerization conditions with the catalyst according to claim 8.

16. The method according to claim 15, wherein the olefins have a general formula of $CH_2$=CHR, with R being hydrogen or a $C_1$ to $C_{12}$ alkyl or aryl group.

17. The catalyst component according to claim 2,
wherein the magnesium compounds are selected from the group consisting of magnesium dihalides and magnesium alcoholates; or
wherein the titanium compounds have titanium tetrachloride.

18. The method according to claim 9, wherein the olefins are selected from propylene and ethylene.

19. The method according to claim 13, wherein the olefins are selected from propylene and ethylene.

20. The method according to claim 15, wherein the olefins are selected from propylene and ethylene.

* * * * *